Aug. 19, 1952 G. W. SCHATZMAN 2,607,612
FENDER SHIELD LATCHING MECHANISM
Filed Aug. 19, 1947 3 Sheets-Sheet 1

Inventor
GEORGE W. SCHATZMAN.

by The Firm of Charles W. Hills
Attys.

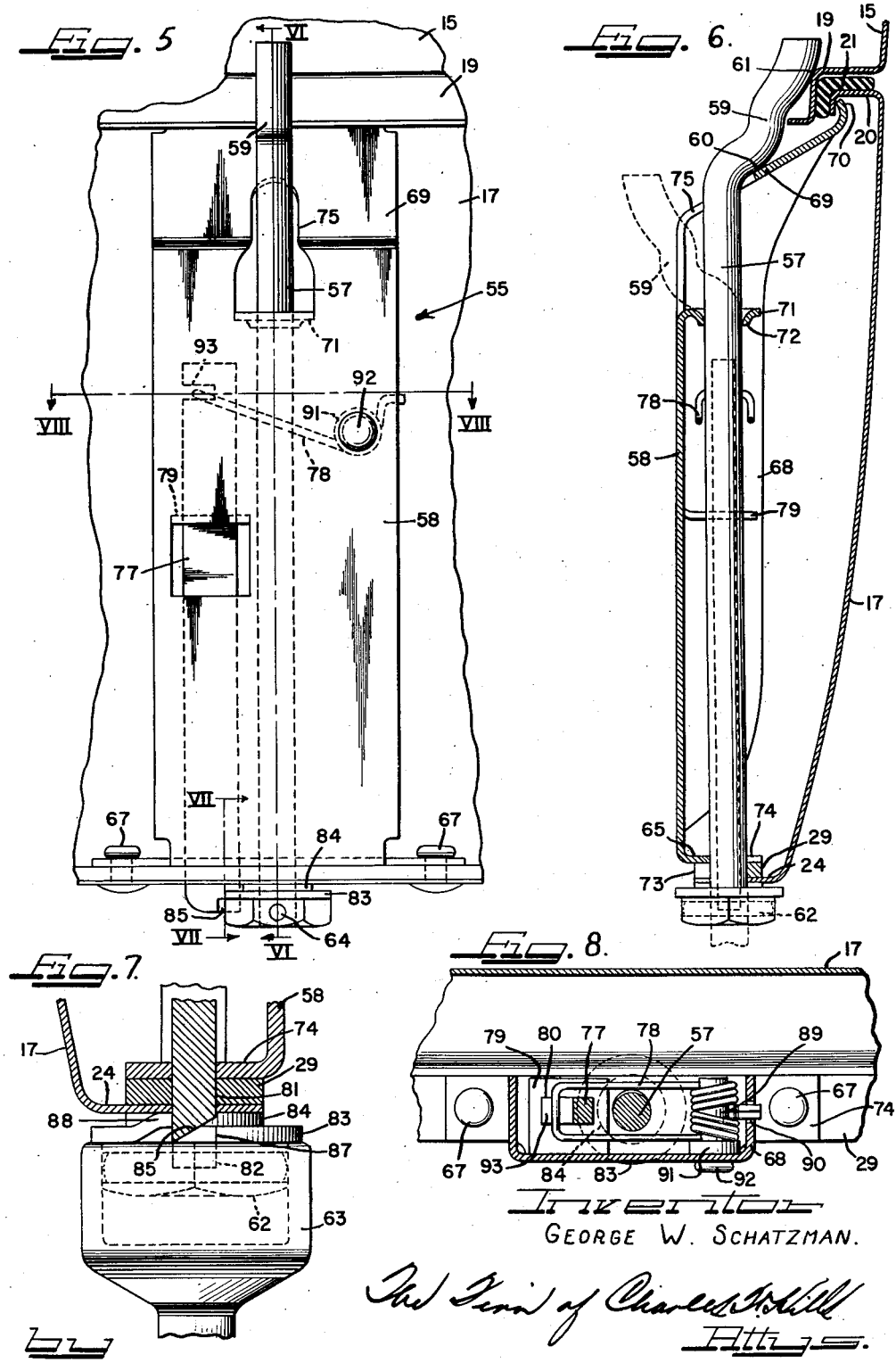
Aug. 19, 1952    G. W. SCHATZMAN    2,607,612
FENDER SHIELD LATCHING MECHANISM
Filed Aug. 19, 1947    3 Sheets-Sheet 2
GEORGE W. SCHATZMAN.

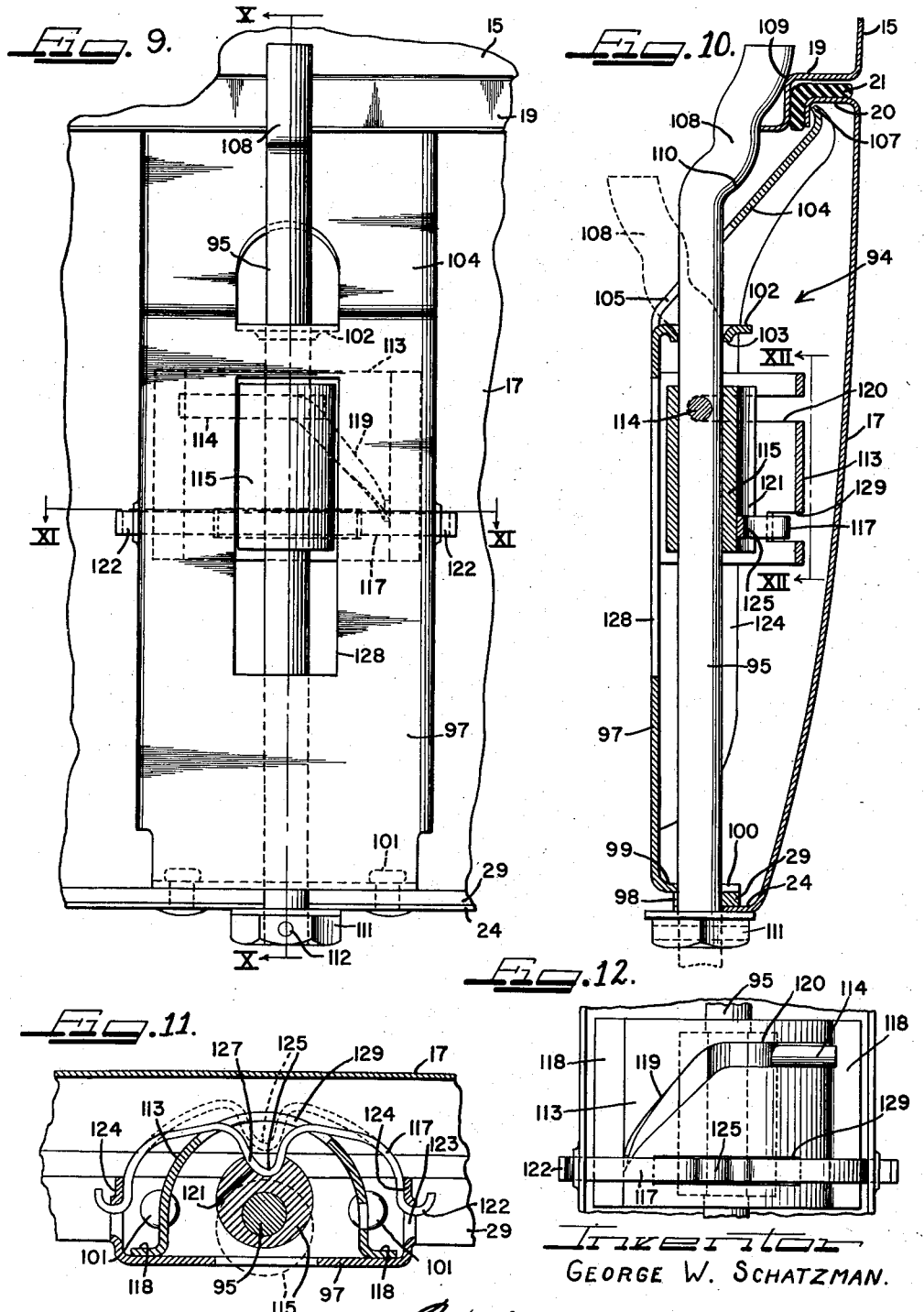

Patented Aug. 19, 1952

2,607,612

UNITED STATES PATENT OFFICE 2,607,612

FENDER SHIELD LATCHING MECHANISM

George W. Schatzman, Detroit, Mich., assignor to Houdaille-Hershey Corporation, Detroit, Mich., a corporation of Michigan Application August 19, 1947, Serial No. 769,503

19 Claims. (Cl. 280—153)

This invention relates to improvements in fender shields or skirts, and more particularly concerns novel latching mechanism by which fender shields are adapted to be held in place on the fenders with which associated.

In the vehicle industry, and particularly in the automobile industry, various means have been utilized to improve the appearance of vehicle fenders. The usual vehicle fender is provided with an opening affording access to the vehicle wheel and permitting ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any member which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body, and whether or not it projects outwardly from the principal body portion of the vehicle.

An important object of the present invention is to provide novel means for latching a fender shield or skirt in position on a fender.

Another object of the invention is to provide a fender shield having improved latching mechanism.

A further object of the invention is to provide an improved fender shield latching mechanism adapted to be manipulated by a conventional wheel wrench.

Still another object of the invention is to provide a fender shield latching mechanism having a rotary latch rod and latch rod control means.

Yet another object of the invention is to provide an improved fender shield latching mechanism which is simple and efficient in operation and involves but a small number of inexpensive, low-cost, rugged parts susceptible of economical mass production methods of manufacture and assembly.

Other objects, features and advantages of the present invention will be readily apparent from the following detailed description of certain preferred embodiments thereof, taken in conjunction with the accompanying three sheets of drawings, in which:

Fig. 5 is a fragmentary rear elevational view, similar to Fig. 2, but showing another somewhat modified fender shield latching mechanism;

Fig. 6 is a fragmentary, vertical sectional detail view taken substantially on the line VI—VI of Fig. 5;

Fig. 7 is an enlarged fragmentary sectional detail view taken substantially on the line VII—VII of Fig. 5, and showing a wrench applied for actuating the mechanism;

Fig. 8 is a horizontal sectional detail view taken substantially on the line VIII—VIII of Fig. 5;

Fig. 9 is a fragmentary inside elevational view of a still further modified form of latching mechanism;

Fig. 10 is a vertical sectional detail view taken substantially on the line X—X of Fig. 9;

Fig. 11 is a horizontal sectional detail view taken substantially on line XI—XI; and Fig. 12 is a fragmentary elevational view taken as though looking in the direction of the arrows of the section line XII—XII of Fig. 10.

Figure 1:
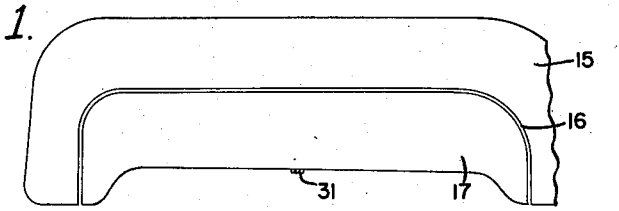
Figure 1 is a fragmentary outside elevational view of a fender and fender shield assembly embodying features of the present invention.

Having reference to Fig. 1, a fender 15 has a wheel access opening 16 which is normally closed by a fender shield 17, sometimes also referred to as a fender skirt, which is held in place in the opening 16 by any suitable means located at the ends of the fender shield and interengageable with the fender, or means carried by the fender and interengageable by appropriate means at the end of the fender shield, and of such a character that the fender shield can be conveniently mounted on the fender or removed as desired.

Figure 2:
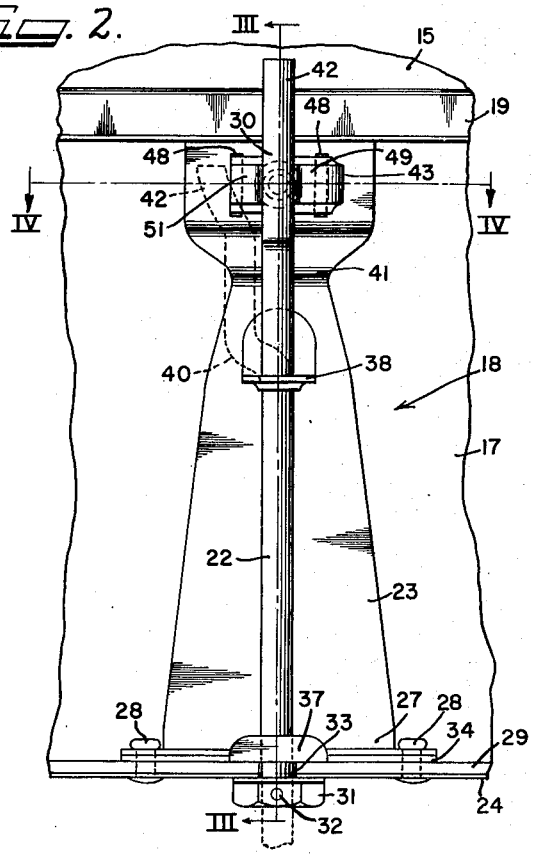
Fig. 2 is an enlarged fragmentary inside elevational view of the fender and fender shield assembly showing one form of the novel fender shield latching mechanism of the present invention.

Herein the fender shield 17 is of the type which is adapted to be mounted initially and primarily at its ends, that is, the ends of the fender shield are first placed in association with the fender 15 at the opening 16 and the principal load or weight of the fender shield is sustained by the interconnections effective at the ends of the fender shield. Then, as a final maneuver in mounting the fender shield, a latching mechanism, herein generally identified by the numeral 18 (Fig. 2), and preferably carried at the inside central portion of the fender shield, is operated to retain the fender shield in fully mounted, concealing relation to the fender opening 16. By preference, the fender and fender shield are so related in the closed condition of the fender shield that the latter lies substantially flush with the outer surface of the fender. For this purpose the fender is provided with a marginal angular inset flange 19 (Fig. 3) providing, in effect, a rabbet about the opening 16 and receptive of a marginal inturned angular flange 20 on the fender shield 17 and carrying a cushioning gasket 21 which fits against at least the downwardly projecting leg of the angular flange 19. In assembly, the gasket 21 is squeezed or compressed between the fender flange 19 and the fender shield flange 20 to maintain a rattle-free relationship between the fender shield and the fender.

According to the present invention, the latching mechanism 18 comprises a rotary latch member in the form of a rod which is rotatably and reciprocably supported by means including a vertical strut 23 preferably mounted centrally of the fender shield 17 in a vertical position between the upper margin of the fender shield at the reinforcing flange 20 and the lower margin of the fender shield above a horizontal inwardly projecting reinforcing flange 24.

At its upper end, the strut 23 has an inturned end flange 25 which engages within the reentrant corner provided at the inner angular margin of the fender shield top reinforcing flange 20. At its lower end strut 23 has an inturned foot flange 27 which is arranged to be secured to the lower fender shield reinforcing flange 24 as by means of rivets 28, a reinforcing bar 29 being interposed between the flanges.

The construction and arangement are such that the latch rod 22 is adapted to be reciprocably and rotatably moved relative to the fender shield 17 into and out of latching position, as required in the mounting and removal of the fender shield. To this end, the latch rod 22 is preferably formed from cylindrical rod material such, for example, as may be supplied to the trade as heavy gauge wire or rod stock, a stock of approximately 5/16 inch diameter having been found quite satisfactory in practice.

Eccentrically disposed at the upper end of the straight body portion which constitutes the major length of the rod 22, is a latching head 30 which is adapted to be swung on an arc about the axis of the body of the rod into latching and non-latching positions through the medium of a suitable wrench, such as a conventional wheel wrench, applied to a wrench-engageable base structure such as a nut or bolt head 31 carried by the lower end of the rod. The wrench base 31 is preferably fixedly secured to the rod as by means of a pin 32. For convenient access by means of the manipulating wrench, the wrench base 31 is disposed conveniently below the lower reinforcing flange 24 of the fender shield, where it is readily accessible.

A rotary and reciprocable bearing is provided for the rod 22 adjacent its lower end and above the wrench base 31 within an inwardly opening slot 33 formed in the lower edge flange 24 on the fender shield and the superimposed reinforcing bar 29, the foot flange 27 being similarly notched. Means for retaining the rod 22 slidably within the bearing notch 33 comprises a retainer plate 34 which is interposed between the foot flange 27 and the reinforcing bar 29 and has a rod clearing slot 35 opening outwardly, that is in reverse to the slot 33, while a reinforcing keeper flange 37 at the inner edge of the plate 34 extends upwardly parallel to the rod 22 and retains the rod in the bearing slot 33.

Adjacent to the latching head 30, the rod 22 is reciprocably and rotatably guided by a bearing eye 38 struck out inwardly from the body of the strut 23, the strut being formed in the present instance from suitable sheet metal. The bearing eye 38 is preferably formed with a down turned bearing flange 39 about the eye aperture therein for smooth bearing engagement with the rod. The bearing eye 38 is preferably located at an elevation such that in the non-latching or open condition of the latching mechanism, the latch rod will be supported with the head 30 below the upper edge of the fender shield 17, that is, in a position to clear the fender flange 19 in swinging the fender shield into and out of mounted position. As shown in the dash position of Fig. 2, a shoulder 40 formed by an integral connecting bend at the base of the eccentric latching head 30 engages upon the eye flange 38 in the non-latching position of the latch rod.

Figure 3:
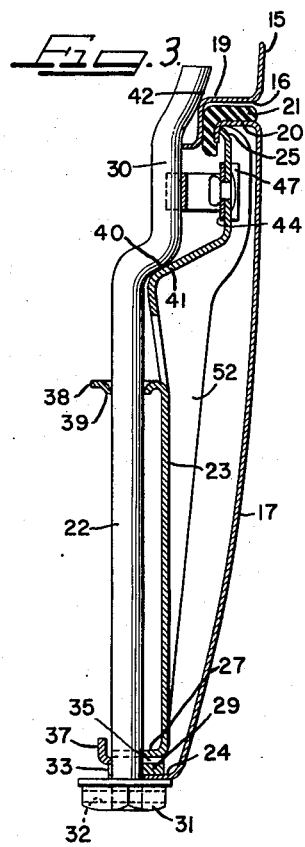
Fig. 3 is a vertical sectional view taken substantially on the line III—III of Fig. 2.

In latching position, the latch head 30 is raised by upward reciprocable movement of the latch rod 22 until the shoulder 40 at the base of the head clears an inwardly protruding horizontal shoulder 41 formed in the strut 23 and from which the upper portion of the strut extends forwardly and thence upwardly toward the upper edge flange 25. In this position, the latching head 30 upon being swung full outwardly as shown in Fig. 3 engages with the inner side of the fender reinforcing flange 19 in such a manner as to draw the fender shield flange 20 clampingly toward the downwardly extending leg of the flange 19 to compress the gasket 21 therebetween. To assist in this clamping relationship, the upper extremity of the head 30 is preferably formed with a cam portion 42 which extends on an arc relative to the upper portion of the head, as seen in Fig. 3. In this condition, the shoulder 40 of the latch rod opposes the shoulder 41 of the strut and the rod is thereby held against downward reciprocable movement out of the latching engagement with the fender flange 19. It will thus be seen that in order to release the fender shield, the latching head 30 must be swung by rotation of the rod 22 approximately 90 degrees to clear the head 30 relative to the strut shoulder 41, whereupon the rod 22 can drop to the inactive position as shown in dash outline in Fig. 2.

Figure 4:
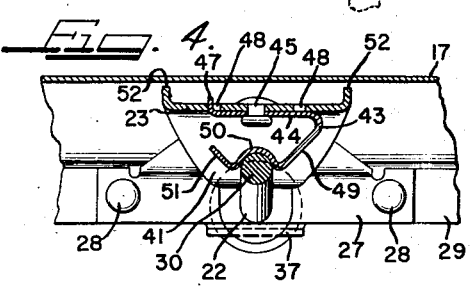
Fig. 4 is a horizontal sectional view taken substantially on the line IV—IV of Fig. 2.

Means are provided for holding the latch rod 22 against turning out of the latching position. Herein such means comprises a spring catch structure 43 which, as best seen in Figs. 3 and 4, comprises a strip spring metal member which has a base flange 44 bearing against the inner side of the upwardly extending portion of the strut 23 above the shoulder formation 41 and to which the base flange is secured as by means of a rivet 45. To hold the spring clip member 43 against rotation out of the operative position, the extremity of the base flange 44 is formed with a right angularly outturned flange 47 which extends through a vertical slot 48 provided for this purpose in the strut 23. By preference a pair of the slots 48 is formed in spaced parallel relation adjacent opposite sides of the upper head portion of the strut so as to make the same readily interchangeable for use on either a left or right-hand fender shield. From the opposite end of the base 44, a generally oblique cam and spring flange 49 extends at an angle inwardly toward the latch rod 22, an out turned keeper half loop 50 being formed at the extremity of the flange 49 for yieldably engaging the upwardly extending portion of the head 30 between the shoulder 40 and the cam portion 42 thereof. The opposite side of the keeper loop 50 is formed with a cam flange 51 which is appropriately obliquely formed and of a good length so that the latch rod head 30 can be cammed into the keeper loop 50 from either side as the head is swung in the rotation of the rod 22. It will be clear, of course, that the head 30 can be cammed into the keeper loop 50 slightly easier from the outer flange 51 side thereof than from the flange 49 side thereof since greater leverage for flexing the flange 49 is prevalent at the cam flange 51 end. It will thus be apparent that once the head 30 has been engaged within the cradle provided by the keeper loop 50 of the catch spring clip 43, the latch rod 22 will be held effectively against unintentional rotation out of its latching position. This, together with the retention of the latch rod 22 against dropping down out of latching position as afforded by the opposition of the strut shoulder 41 to the latch rod shoulder 40 maintains the latch rod effectively against opening except when it is intentionally turned to the open or non-latching position through manipulation of the wrench base 31. For this purpose, of course, the junctures of the flanges 49 and 51, respectively, with the rod head engaging keeper loop are rounded so that the head 30 will cam thereby upon the application of sufficient manual rotary force to the latch rod 22 to swing the head 30 toward the non-latching position.

The strut 23 is preferably reinforced at its longitudinal edges by means of integral out turned flanges 52.

As shown in Figs. 5 to 8, inclusive, a modified fender shield latching mechanism 55 is provided which may be substituted, where preferred, for the latching mechanism 18 previously described. Accordingly, the fender and fender shield structures may be identical as to those in the first form of the invention described and are therefore identically numbered in their various details.

The latching mechanism 55 includes a rotary and reciprocable latch rod 57 and supporting mechanism therefor including a strut 58. Throughout the major portion of its length the latch rod 57 is straight and cylindrical and at its upper end the latch rod is formed with an eccentrically disposed latching head 59 formed with an off-setting shoulder 60 and an arcuate cam head terminal 61, the latter being engageable with the fender flange 19 in the latching position of the latch rod, and operative substantially like the latch rod 22 previously described. At its lower end, the latch rod 57 has a wrench base member 62 which may be hexagonal as shown and adapted to be engaged by a wrench 63 to turn the latch rod 57. A pin 64 may be provided for securely and fixedly fastening the wrench base member 62 onto the lower portion of the rod 57. The strut 58 is preferably of such form that it can conveniently be made from sheet metal by a simple die stamping process and includes a foot flange 65 which in this instance extends outwardly and rests upon the reinforcing bar 29 to which it is secured as by means of rivets 67. The side edges of the strut are preferably formed with reinforcing flanges 68. At its upper end the strut 58 extends obliquely upwardly and outwardly, providing an upwardly facing shoulder 69 which terminates in a curved upwardly and inwardly turned flange 70 which cooperates with the fender shield upper marginal flange 20 in connecting the strut and the fender shield together and in drawing the fender shield 20 clampingly toward the fender flange 19 in the operation of the latch rod 57. Vertically reciprocal and rotary guidance for the latch rod 57 is provided by an out turned integral bearing ear or eye 71 formed on the upper portion of the strut 58 below the shoulder 69 and formed with a bearing eye defined by a down turned annular flange 72. At its lower end the rod 57 is bearingly guided within a slot 73 formed in the inner edge of the reinforcing bar 29 and the supporting lower fender shield reinforcing flange 24, the rod being held bearingly in the slot 73 by the foot flange 65 which, for this purpose, is provided with an outwardly opening complementary retainer slot 74 so that the inner edge of such retainer slot opposes the rod and holds it in the bearing slot 73.

Clearance for the upper portion of the latch rod 57 to project upwardly beyond the shoulder portion 69 of the strut is afforded by a slot 75 which cuts through the juncture of the shoulder 69 with the vertical body portion of the strut and extends down to the eye 71, being in part formed by the striking out of the material forming the eye 71. The upper extent of the clearance slot 75 is such as to afford ample clearance for the rod 57 projecting upwardly therethrough.

In the non-active or open condition of the latch rod 57, the head 59 is turned inwardly and is received in the slot 75 so that the shoulder 60 rests upon the bearing eye 71 and the head thereby is amply depressed to be below the upper edge of the fender shield and clear the fender flange 19 in the mounting or removal of the fender shield.

To place the latch rod 57 into its latching or operative position, the latch rod is pushed upwardly until the head 59 clears the slot 75 above the shoulder 69 and the rod is then turned outwardly until the cam portion 61 of the head bearingly and clampingly engages the fender flange 19. In this position the off-setting shoulder 60 of the head lies above the opposing upwardly facing shoulder 69 of the strut and the rod is thereby held against unintentional depression or sliding downwardly out of clamping engagement with the fender flange 19.

The width of the slot 75, and particularly the portion of the slot which cuts through the shoulder portion 69 of the strut is such that the head 59 cannot clear the slot and depress the rod 57 until the rod has been turned a full 180 degrees from the latching position. When the rod 57 is to be returned to the latching position, on the other hand, it cannot be turned around to the latching position until it has been sufficiently elevated by pushing up on the lower end thereof to clear the head 59 from the slot 75.

Means are provided for holding the rod 57 against accidental rotation out of latching position. Herein such means comprise a spring catch structure engageable with an eccentrically disposed portion of the latch rod assembly, herein including a detent bar 77 and a biasing spring 78. The detent bar 77 is of substantial length and may be of rectangular cross section, being guided for reciprocal movement within a bearing ear 79 struck out from the body of the strut 58 and formed with a bearing aperture 80. The bearing ear 79 is preferably located to guide the upper portion of the detent bar. The lower end portion of the detent bar is reciprocably guided in a bearing aperture 81 formed through the superimposed foot flange 74, reinforcing bar 29 and lower marginal reinforcing flange 24.

At its lower end, the detent bar 77 is arranged to engage in an upwardly opening notch 82 formed in the upper side of the wrench head 62 so that when the lower end of the detent bar is in such notch the wrench head 62 is held against rotation thereby holding the rod 57 against rotation. The location of the notch 82 is such that the detent 77 engages therein only in the full latching position of the latch rod.

The construction and arrangement of the detent bar 77 is such that when the wrench 63 is applied to the wrench base 62, the lower end of the rod is engaged by the wrench head and the bar is pushed upwardly out of the detent slot 82 in the wrench base. A limit upon the reception of the wrench base 62 into the socket of the wrench head is effected by providing a limit washer or flange 83 which is of at least the diameter of the circle described by the corners of the wrench base 62 and is secured as by welding or the like to the upper side of the wrench base. Between the washer 83 and the lower fender shield reinforcing flange 24 is preferably interposed a spacer washer 84. In order that the detent bar 77 will clear the limit flange 83, the portion of the bar which engages the wrench base is formed with a diagonal cam surface 85 which is of such pitch as to extend into camming engagement with an edge of a radial notch 87 formed in the limit flange 83 and in registry with the notch 82 so that as the wrench base 62 is turned, the edge of the notch 87 will cam against the cam surface 85 and push the detent bar 77 upwardly until the lower end thereof rides upon the upper face of the limit flange 83. Thereby the detent bar 77 is held in the inactive position and the rod 57 can be turned fully to the extent necessary to release the latch head 59 from its latching position in the manner previously mentioned. At the opposite side of the notch 87, the limit flange 83 is pressed up to form a stop 88 engageable with the side of the detent bar 77 when the latch rod 57 is turned back to latching position and the end of the latch rod is in registry with the notches 87 and 82. Thus, the stop 88 prevents overturning of the latch rod. As the wrench 63 is then drawn away from the wrench head 62, the detent bar 77 drops down into the detent notch 82.

Although gravity could be relied upon for actuating the detent bar 77 and causing it to drop into the detent notches 82—87, it is preferred to bias the same by means of the spring 78 so that foreign matter, such as may be splashed onto the mechanism from the adjacent wheel of the vehicle, will not interfere with proper operation of the detent. In the present instance, the biasing spring 78 is in the form of a rectangular loop as best seen in Fig. 8, having the ends thereof coiled about a pin 89 carried by the strut 58, the extremities of the end portions of the spring extending in parallelism through an aperture 90 in the adjacent side flange 68 of the strut. The pin 89 is preferably formed with an integral collar 91 from which extends a rivet head portion 92 by which the pin is secured to the wall of the strut 58 at an appropriate point on the opposite side of the latch rod 57 from the detent bar 77, the width of the legs of the spring 78 being such as to freely straddle the latch rod 57. The closed loop end portion of the spring 78 is engaged within an appropriate slot 93 formed in the upper end portion of the detent bar 77 at such height relative to the elevation of the pin 89 of the spring to maintain the spring under torsion load in the slot.

In the further modification shown in Figs. 9 to 12, the fender and fender shield are of substantially the same character as in the previous two forms of the invention described, and therefore similar reference numerals will be used to designate similar parts. However, while there is some similarity between the latching mechanism, identified generally at 94, and the latching mechanism of Fig. 5, there are certain differences which, under certain circumstances, may prove more desirable.

As the principal element of the latching mechanism 94, a rotatable and reciprocable latch rod 95 is provided which is reciprocably and rotatably bearingly guided by a strut plate 97 and the lower marginal reinforcing flange 24 and the reinforcing bar 29 of the fender shield. To this end, the reinforcing bar and the supporting lower fender shield flange 24 are formed with an outwardly opening bearing slot 98 reciprocably and rotatably receiving the lower end portion of the latch rod 95; and the lower end portion of the strut member 97 is formed with a foot flange 99 having an outwardly opening slot 100 clearing the rod 95 and serving to retain the rod in the bearing slot 98. The foot flange 99 is supported upon the reinforcing bar 29 and is secured to the bar and to the lower marginal fender flange 24 by rivets 101.

The strut 97 extends upwardly parallel to the rod 95 through an integral outwardly extending bearing eye 102 which is formed with an appropriate aperture defined by downturned bearing flange 103 through which the upper portion of the latch rod 95 extends in reciprocable and rotatable bearing relation. Above the eye 102 is an outwardly oblique shoulder portion 104 on the strut and formed with a clearance slot 105 through which the latch rod extends. The extremity of the strut is formed with an inwardly and upwardly extending extremity flange 107 which fits within the angular upper marginal flange 20 of the fender shield and cooperates with the same for clampingly drawing the same toward the fender reinforcing flange 19 in response to clamping action of a clamping head 108 on the upper end of the latch rod 95. The extremity of the head 108 is formed with an upwardly curved cam portion 109 which engages the flange 19. In the non-operating or release position thereof, the latch rod 95 is turned so that the head 108 clears the slot 105 and assumes the inwardly turned position as indicated in dash outline in Fig. 10. In this position the off-setting bend which provides a shoulder 110 rests upon the bearing eye 103. In this position the head 108 is below the upper marginal flange 20 of the fender shield and amply clears the fender flange 19 in the opening and closing of the fender shield.

At its lower end, the latch rod 95 carries a wrench head 111 which may be hexagonal similarly as in the previous forms and is secured to the lower terminal of the rod by means of a pin 112.

The latching mechanism 94 is provided with means for controlling the reciprocal as well as the rotational movements of the latch rod 95. Herein such means comprise a cam guide member 113 cooperative with a follower pin 114 carried by the latch rod for controlling the vertical movements of the latch rod, and a catch assembly including a catch barrel 115 and a cooperating keeper spring 117.

The cam guide member 113 comprises an arcuate plate having end flanges 118 extending in opposite directions in the same plane and secured to the outer face of the strut 97 in any suitable manner as by means of welding. A cam slot 119 in the member 113 is disposed in an oblique direction at one side of the member 113 and runs to approximately the bulge center thereof whence it merges with a horizontal slot extension 120. The arrangement of the cam slot is such that when the shaft 95 is rotated, the follower pin 114 travels the slot and controls the vertical disposition of the latch rod 95, the horizontal portion 120 of the slot being of such length that the latch rod 95 is rotated without vertical movement throughout an arc of approximately 90 degrees until the shoulder 110 of the latch head has swung around from the latching position to non-latching position sufficiently to clear the shoulder 104 of the strut whereupon the pin enters the diagonal cam portion of the slot and the latch rod is caused to depress gradually to its non-latching position as rotation thereof continues until the head 108 has been moved around approximately 180 degrees and comes to rest on the supporting and bearing eye 102. Reverse rotation of the latch rod 95, of course, carries it back to the latching position.

In the latching position, the keeper spring 117 of the catch assembly engages within a vertical groove 121 in the barrel 115. For this purpose the spring 117 is a bowed leaf spring having outwardly hooked ends 122 engaging in respective holes 123 punched in side reinforcing flanges 124 of the strut 97. At its mid point, the spring 117 is looped inwardly to provide a keeper detent 125 which engages in the groove 121 of the catch barrel 115. As best seen in Fig. 11, the side of the detent loop 125 which is engaged by the trailing side of the groove 121 upon rotation of the rod 95 toward open or non-latching position is formed on a cam arc as indicated at 127 so as to facilitate camming of the spring detent 125 by a flexing of the spring to dislodge the detent 125 from the groove. The opposite side of the detent is preferably formed relatively flat so as to provide a definite limit upon turning of the clamping rod into the latching position.

The catch spring 117 is preferably relatively stiff so as to assume strong latch rod retaining engagement with the barrel 115, and the arrangement is therefore preferably such as to facilitate the flexing of the spring. To this end, the barrel 115 is preferably formed as an eccentric with the groove 121 at the side toward which the barrel protrudes farthest relative to the axis of the rod 95, the barrel being maintained eccentrically upon the rod by means of the pin 114 extending transversely through the barrel and the rod as shown in Figs. 9 and 10. In this manner the detent portion 125 of the spring rides the periphery of the barrel 115 as the barrel is turned around with the latch rod. When the rod is turned to the non-latching position, the barrel will assume the position substantially as shown in dash outline in Fig. 11, with the major protruding portion extending through a barrel clearance aperture 128 in the body of the strut 97. In this position the spring 117 will be relatively relaxed. When the latch rod 95 is turned back toward the latching position, the spring 117 will be gradually placed under load or stress as the latch rod is moved upwardly by the cam slot 119 and after the follower pin 114 reaches the horizontal portion 120 of the slot the barrel 115 places the spring under increasing tension until maximum tension is attained wherein the keeper loop 125 of the spring snaps into the groove 121 and the latching movement of the rod is completed. Since the spring is placed under substantial resilient stress or load by this action, the latch rod 95 is held quite securely against unintentional turning out of the latching position thereof. In order to clear the detent portion of the spring through the cam plate 113, the latter is preferably formed with a horizontal slot 129.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and having a head engageable with said fender margin for securing the fender shield in final closing relation to the access opening, said mechanism including a supporting structure carried by the fender shield, a rotary and reciprocable latch rod supported and guided by said supporting structure, and a yieldable catch device carried by said supporting structure for holding the latch rod in latching position, said supporting structure having an upwardly facing shoulder spaced substantially below said fender margin and said latch rod including a radially extending portion thereof below said head cooperating releasably with said shoulder for holding the latch rod against dropping from latching position until released from said catch device and rotated out of engagement with the fender margin.

2. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and engageable with said fender margin for securing the fender shield in final closing relation to the access opening, said mechanism including a supporting structure carried by the fender shield, a rotary and reciprocable latch rod supported and guided by said supporting structure, and a yieldable catch device carried by said supporting structure for holding the latch rod in latching position, said supporting structure and said latch rod including cooperating means for holding the latch rod against dropping from latching position until released from said catch device and rotated out of engagement with the fender margin, said cooperating drop preventing means including a shoulder on the latch rod and a cooperating shoulder on the supporting structure.

3. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and engageable with said fender margin for securing the fender shield in final closing relation to the access opening, said mechanism including a supporting structure carried by the fender shield, a rotary and reciprocable latch rod supported and guided by said supporting structure, and a yieldable catch device carried by said supporting structure for holding the latch rod in latching position, said supporting structure and said latch rod including cooperating means for holding the latch rod against dropping from latching position until released from said catch device and rotated out of engagement with the fender margin, said cooperating means on the latch rod and the supporting structure comprising a cam slot member on the supporting structure and a pin carried by the latch rod.

4. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and engageable with said fender margin for securing the fender shield in final closing relation to the access opening, said mechanism including a supporting structure carried by the fender shield, a rotary and reciprocable latch rod supported and guided by said supporting structure, and a yieldable catch device for holding the latch rod in latching position, said supporting structure and said latch rod including cooperating means for holding the latch rod against dropping from latching position until released from said catch device and rotated out of engagement with the fender margin, said catch device comprising a spring member carried by the supporting structure and engageable with the latch rod and the latch rod having an eccentric portion engageable with the spring member.

5. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and engageable with said fender margin for securing the fender shield in final closing relation to the access opening, said mechanism including a supporting structure carried by the fender shield, a rotary and reciprocable latch rod supported and guided by said supporting structure, and a yieldable catch device for holding the latch rod in latching position, said supporting structure and said latch rod including cooperating means for holding the latch rod against dropping from latching position until released from said catch device and rotated out of engagement with the fender margin, said catch device including a reciprocable, yieldably biased catch bar supported by the supporting structure and the latch rod having an eccentrically disposed structure thereon releasably engageable by the catch bar.

6. In combination in a fender and fender shield assembly, the fender having a wheel access opening and the fender shield being adapted to afford an ornamental closure for said opening, the upper margin of the fender shield being movable toward and away from the margin defining the wheel access opening in the fender as an incident to mounting and removal of the fender shield, and latching mechanism carried by the fender shield and engageable with said fender margin for securing the fender shield in final closing relation to the access opening, said mechanism including a supporting structure carried by the fender shield, a rotary and reciprocable latch rod supported and guided by said supporting structure, and a yieldable catch device for holding the latch rod in latching position, said supporting structure and said latch rod including cooperating means for holding the latch rod against dropping from latching position until released from said catch device and rotated out of engagement with the fender margin, said catch device comprising a spring detent carried by the supporting structure and the latch rod having a detent-receiving structure thereon.

7. In combination in a fender shield construction, a fender shield panel, said panel having upper and lower marginal inturned flanges, the lower flange having mounted thereon a latch strut, the upper end of the strut engaging the upper flange, said strut having an eye struck out therefrom, a vertically reciprocal and rotary latch rod bearingly guided by said eye, the upper end of the latch rod having an eccentric latching head engageable with the adjacent margin of a fender with which the fender shield may be associated in assembly, said head having a shoulder, and a shoulder on said strut opposing said head shoulder and active to prevent dropping of said rod out of latching position until the rod is turned to carry the head shoulder away from said strut shoulder.

8. In combination in a fender shield latching mechanism, a vertical strut having an intermediate shoulder formation and a latch rod bearing structure, a vertically reciprocable and rotatable latch rod guided by said bearing structure, said latch rod having a shoulder formation thereon arranged to be disposed in opposition to the strut shoulder in the latching position of the rod to maintain the rod against dropping out of latching position, and a catch device supported by the strut and releasably engageable with a portion on the rod for holding the rod against unintentional turning out of the latching position.

9. In combination in a fender shield latching mechanism, a vertical strut having an intermediate shoulder formation and a latch rod bearing structure, a vertically reciprocable and rotatable latch rod guided by said bearing structure, said latch rod having a shoulder formation thereon arranged to be disposed in opposition to the strut shoulder in the latching position of the rod to maintain the rod against dropping out of latching position, and a catch device for holding the rod against unintentional turning out of the latching position, said catch device comprising a spring member engageable with the rod above said strut shoulder.

10. In combination in a fender shield latching mechanism, a vertical strut having an intermediate shoulder formation and a latch rod bearing structure, a vertically reciprocable and rotatable latch rod guided by said bearing structure, said latch rod having a shoulder formation thereon arranged to be disposed in opposition to the strut shoulder in the latching position of the rod to maintain the rod against dropping out of latching position, and a catch device for holding the rod against unintentional turning out of the latching position, said catch device comprising a bar mounted for reciprocal action parallel to the rod and having operative engagement with means at the lower end of the latch rod.

11. In combination in a fender shield latching mechanism, a supporting structure, a vertically reciprocable and rotary latch rod having a head thereon for retaining engagement with a fender, means on said supporting structure below said head for bearingly guiding the latch rod, said supporting structure and said latch rod having opposing shoulders located substantially below and independent of said head and adjacent to said bearing means cooperative to maintain the rod against unintentional dropping from latching position.

12. In combination in a fender shield latching mechanism, a supporting structure, a vertically reciprocable and rotary latch rod having a head thereon for retaining engagement with a fender, means on said supporting structure below said head for bearingly guiding the latch rod, said supporting structure and said latch rod having opposing shoulders located substantially below and independent of said head and adjacent to said bearing means cooperative to maintain the rod against unintentional dropping from latching position, the shoulder on the latch rod comprising an integral eccentrically bent portion of the rod.

13. In combination in a fender shield latching mechanism, a vertical strut of generally U-shape cross section and having the upper portion thereof disposed obliquely, said upper portion having a slot therein, a vertically reciprocable and rotary latch rod extending through said slot and having a head portion swingable into latching position in the rotation of the rod, said head including an eccentric shoulder opposing said oblique portion of the strut in the latching position of the head to retain the rod against unintentional dropping out of latching position.

14. In combination in a fender shield latching mechanism, a rotary latch rod, a wrench base on said rod having an eccentrically disposed upwardly opening notch therein, and a down biased catch bar operable parallel to the rod and having the lower end thereof releasably engageable in said notch to hold the latch rod against unintentional turning.

15. In combination in a fender shield construction, a fender shield panel having upper and lower marginal inturned flanges, a latch mechanism strut having a foot flange turned outwardly, said foot flange being supported upon the lower flange of the fender shield, said strut extending upwardly throughout its major extent substantially vertically and having and oblique upper portion extending to and engaging with the upper flange of the fender shield, said oblique portion having a slot therein opening through the juncture of the oblique portion with the principal portion of the strut, a rotary clamping member extending vertically between the fender shield panel and the strut and having the upper portion thereof extending through said slot, and a bearing structure on said strut below said slot rotatably engaging a portion on said clamping member and supporting said clamping member.

16. In combination in a fender shield construction, a fender shield panel having upper and lower marginal inturned flanges, a latch mechanism strut having a foot flange turned outwardly, said foot flange being supported upon the lower flange of the fender shield, said strut extending upwardly throughout its major extent substantially vertically and having an oblique upper portion extending to and engaging with the upper flange of the fender shield, said oblique portion having a slot therein opening through the juncture of the oblique portion with the principal portion of the strut, a rotary clamping member extending vertically between the fender shield panel and the strut and having the upper portion thereof extending through said slot, a bearing structure on said strut below said slot rotatably engaging a portion on said clamping member and supporting said clamping member, and means carried by the strut below said bearing structure for yieldably maintaining the clamping member in predetermined rotary clamping position.

17. In combination in a latching mechanism for fender shields, a strut, a rotary and reciprocable latch rod supported by said strut, a reciprocation guide plate supported by the strut and disposed in concentric spaced relation about a portion of the rod, said plate having a cam guide slot therein, a follower pin carried by the rod and engaging in said slot, a detent spring associated with said plate, and an eccentric grooved member carried by the rod and engageable with the detent pin in the rotation of the rod to predetermined latching position responsive to interengagement of said pin and slot, the eccentric member being arranged to place the detent spring under maximum detent stress as an incident to attainment of the latching position by the rod.

18. In combination, a fender shield panel having upper and lower inturned marginal flanges, the upper marginal flange being offset outwardly to a substantial extent relative to the lower marginal flange, a sheet metal strut having a lower flange carried upon said lower marginal fender shield panel flange and having its upper end interengaged with said offset upper marginal flange, the major portion of the strut from its lower flange upwardly extending substantially vertically normal to the plane of said lower fender shield panel flange, the upper portion of said strut extending diagonally upwardly toward the back of the fender shield panel and providing an upwardly and inwardly facing shoulder portion, said generally vertical portion of the strut having a horizontal eye projecting integrally therefrom, and a rotational and reciprocable latching rod extending bearingly through said eye and through bearing apertures in the superimposed lower flanges of the strut and fender shield panel, said latching rod having an eccentric latching head thereon and means on the lower end thereof below the lower fender shield panel flange for effecting rotational and translational movement, said latching head having a shoulder portion thereon adjacent to the main body portion of the rod engageable in the released position of the rod with the upper surface of said eye in a position wherein the upper extremity of the head clears the upper margin of the fender shield panel, said rod shoulder in the latching position of the rod overlying the shoulder on the strut and the head extending toward the upper marginal flange of the fender shield panel.

19. In combination in a latching mechanism for fender shields, an elongated rotary latch rod having a latching head at one end and means at the opposite end for rotatably manipulating the rod into and out of latching position, means rotatably supporting the latch rod for movement about its longitudinal axis, a barrel of substantially greater diameter than said rod and fixedly mounted on the rod intermediate said head and said means for manipulating the rod, with the periphery of the barrel eccentric to the rod periphery and turning with the rod in the rotation of the rod, the portion of the barrel periphery at the greatest distance from the rod axis having a detent recess therein opening outwardly, and a resiliently yieldable detent member located on said supporting means operatively adjacent to said barrel periphery and engageable in said detent recess as an incident to turning of the barrel with the latch rod as the latch rod is rotated into latching position, whereby to hold the latch rod against unintentional rotation out of the latching position, said barrel being so related to the yieldable detent as to maintain the detent under substantial stress when engaged in said recesses.

GEORGE W. SCHATZMAN.

REFERENCES CITED

The following references are of record in the file of this patent:

UNITED STATES PATENTS

| Number | Name | Date |
|---|---|---|
| 189,927 | Everest | Apr. 24, 1877 |
| 373,985 | Johnson | Nov. 29, 1887 |
| 887,591 | Cook | May 12, 1908 |
| 2,215,619 | Patrick et al. | Sept. 24, 1940 |
| 2,314,651 | Claud-Mantle | Mar. 23, 1943 |
| 2,334,867 | Fergueson | Nov. 23, 1943 |
| 2,349,466 | Schueren | May 23, 1944 |
| 2,353,553 | Fergueson | July 11, 1944 |